Dec. 22, 1953      G. J. WRIGHT ET AL      2,663,281
MACHINE FOR COATING FRANKFURTERS
Original Filed Nov. 25, 1948      8 Sheets-Sheet 1

INVENTORS
GEORGE J. WRIGHT
RALPH J. WRIGHT
BY
Joseph B. Gardner
atty.

Dec. 22, 1953  G. J. WRIGHT ET AL  2,663,281
MACHINE FOR COATING FRANKFURTERS
Original Filed Nov. 25, 1948  8 Sheets-Sheet 2

INVENTORS
GEORGE J. WRIGHT
RALPH J. WRIGHT
BY

Dec. 22, 1953   G. J. WRIGHT ET AL   2,663,281
MACHINE FOR COATING FRANKFURTERS
Original Filed Nov. 25, 1948   8 Sheets-Sheet 4

INVENTORS
GEORGE J. WRIGHT
RALPH J. WRIGHT
BY
Joseph B. Gardner
atty.

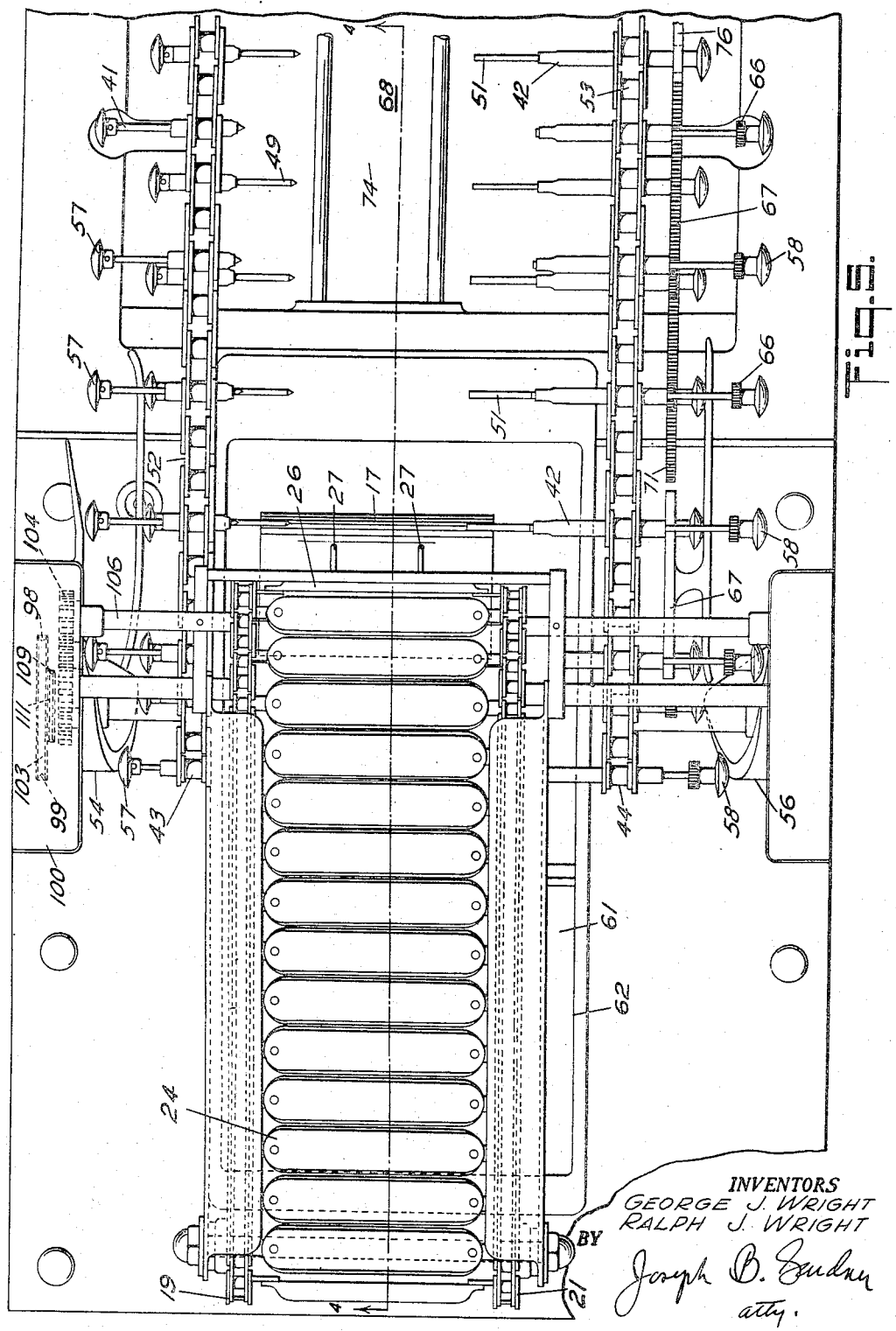

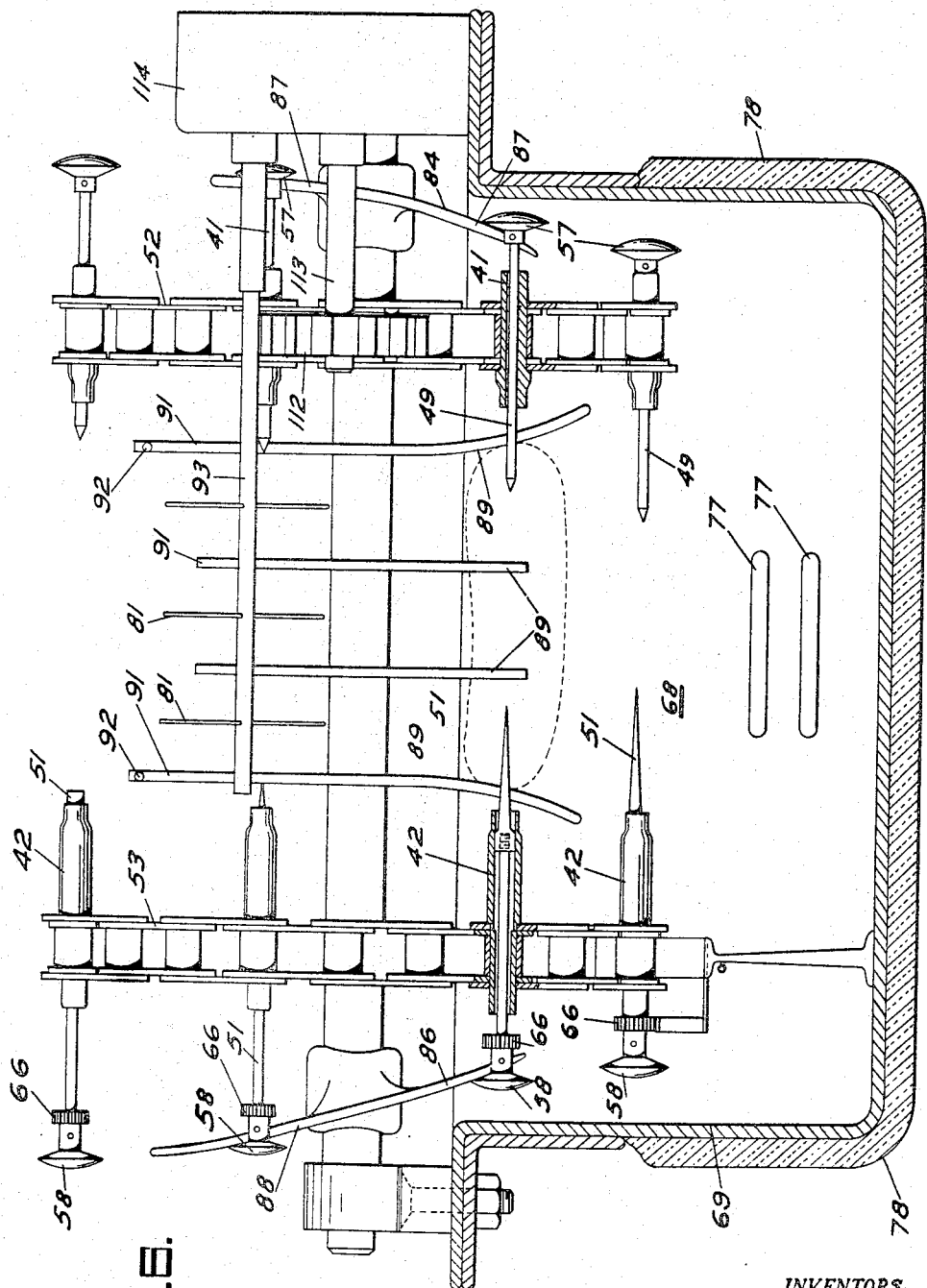

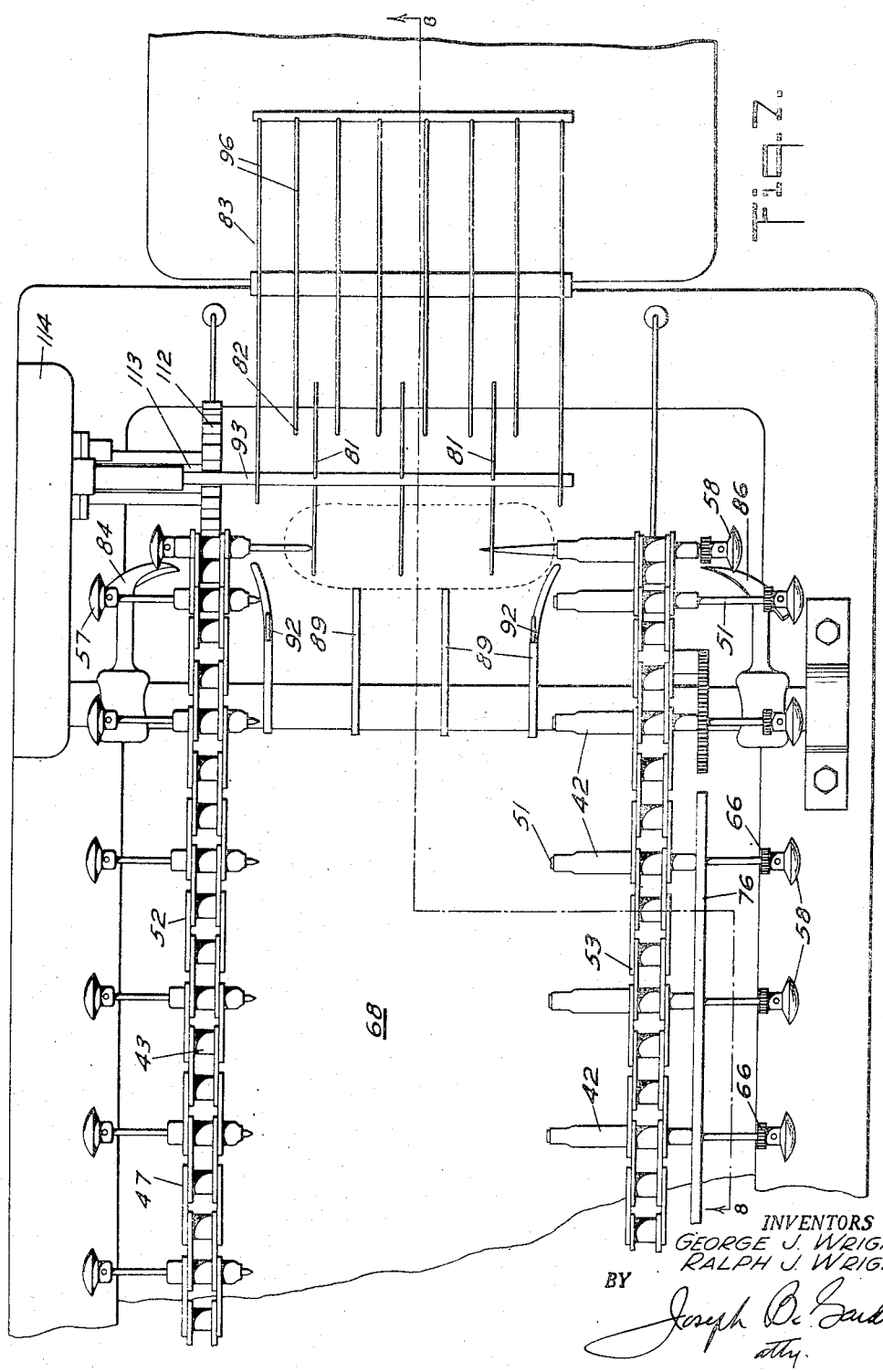

Dec. 22, 1953   G. J. WRIGHT ET AL   2,663,281
MACHINE FOR COATING FRANKFURTERS
Original Filed Nov. 25, 1948   8 Sheets-Sheet 8
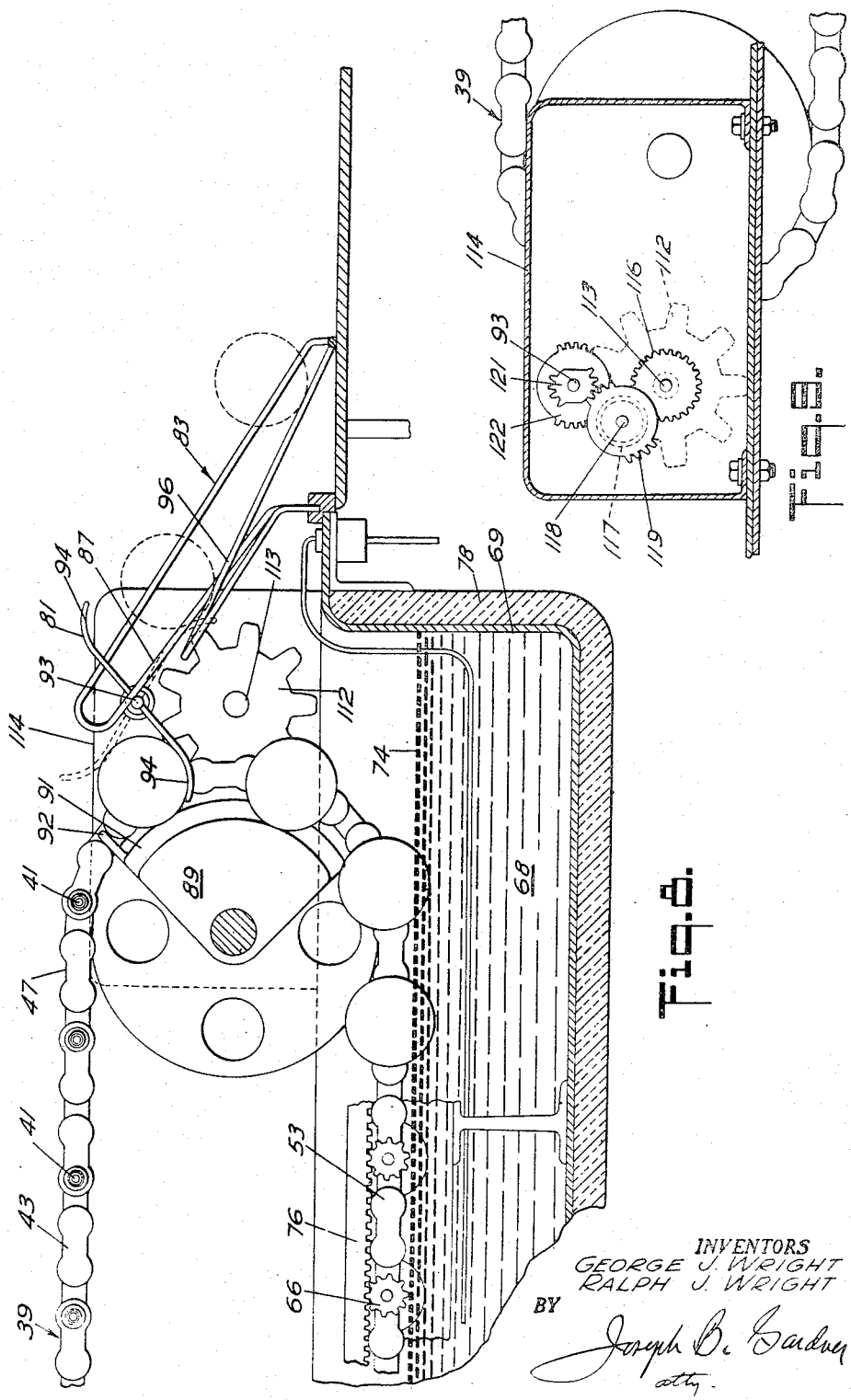
INVENTORS
GEORGE J. WRIGHT
RALPH J. WRIGHT
BY
Joseph B. Gardner
atty.

Patented Dec. 22, 1953

2,663,281

UNITED STATES PATENT OFFICE 2,663,281

MACHINE FOR COATING FRANKFURTERS

George J. Wright, Berkeley, and Ralph J. Wright, Albany, Calif., assignors, by mesne assignments, to Fritter-Chef Corporation, Berkeley, Calif., a corporation of California Original application November 25, 1948, Serial No. 61,316. Divided and this application July 31, 1951, Serial No. 239,551

5 Claims. (Cl. 118—13)

This is a division of our copending application, Serial No. 61,316, filed November 22, 1948, now Patent No. 2,585,364.

The invention relates to machines and processes for preparing and cooking of articles such as frankfurters.

An object of the invention is to provide a machine and process of the character described in which the frankfurter is coated with batter, cooked therewith in a hot oil bath to provide a fritter encased frankfurter and delivered as a cooked product ready to eat, all by a fully automatic and completely mechanized process.

Another object of the invention is to provide a machine and process of the character above which will produce completely cooked and ready to eat fritter enclosed frankfurters in rapid succession, and wherein the frankfurters and fritter batter are carried through the several operations of the machine and process untouched by human hands.

A further object of the invention is to provide a machine and process of the character above which will provide a properly cooked frankfurter encased in a delectable fritter-type coating replacing the conventional frankfurter bun, the completed food product being a most palatable, generally improved and more digestible type of food of the character described.

An additional object of the present invention is to provide an improved method of and apparatus for coating an uncooked frankfurter with batter preparatory to cooking wherein the method affords and the apparatus provides automatic means for rapidly coating the frankfurter with batter, with all of the frankfurter so processed coated uniformly with a proper thickness of batter.

Still another object of the invention is to provide a process and apparatus for cooking the frankfurter and the batter coating together while immersed in the cooking oil in such a manner that uniformity of product of improved quality is insured.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 5 is a fragmentary top plan view of the portion of the machine illustrated in Figure 4.

Figure 6 is an end elevation of the machine taken from the delivery end, with the cooking oil container broken away and shown in section.

Figure 7 is a fragmentary top plan view similar to Figure 5 but showing the delivery end and adjacent portion of the machine.

Figure 8 is a vertical sectional view of the portion of the machine shown in Figure 7, the plane of the section being indicated by the line 8—8 of Figure 7.

Figure 9 is a detail side view, partly in section, of an intermittent gear mechanism utilized in connection with the discharge operation.

The frankfurter machine illustrated in the accompanying drawings includes a series of successively arranged and co-acting mechanisms by means of which frankfurters and batter are supplied to one end of the machine, carried through a succession of steps wherein the frankfurters are coated with batter, then cooked with the batter coating in a hot oil bath, and finally delivered in a completely cooked state, ready to eat, all in a rapid sequential order. Preferably, the several parts of the machine are unitarily supported on a frame 15, and desirably, for commercial purposes, the several parts are contained in an attractive housing with appropriate windows for viewing of automatic operations and openings for input of the frankfurters and batter, and a discharge opening for the completed food product. The housing, being purely a display feature of the machine, is not here illustrated.

Figure 3:
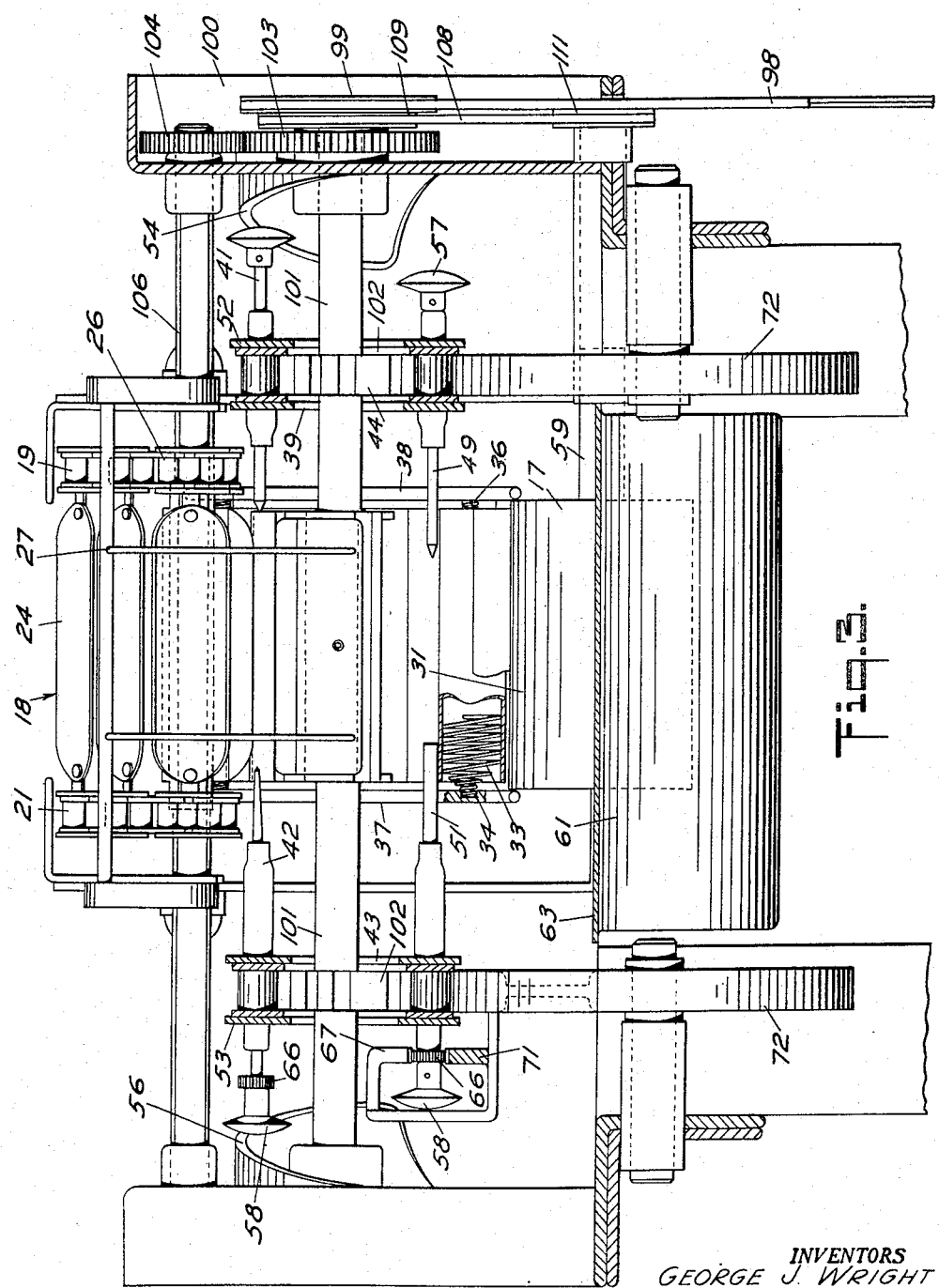
Figure 3 is a cross-sectional view on a somewhat enlarged scale and taken substantially on the plane of line 3—3 of Figure 2.
Figure 4:
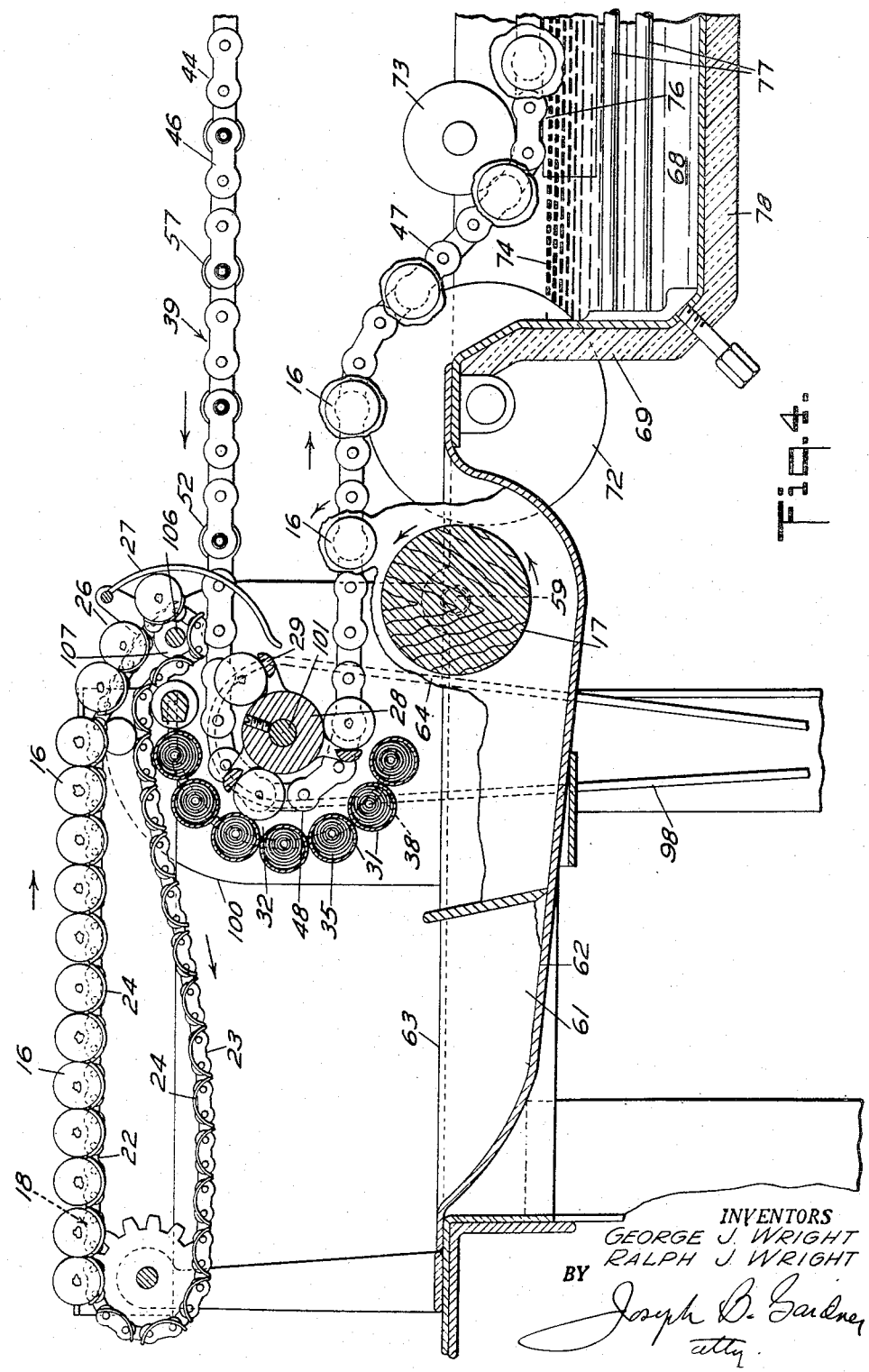
Figure 4 is a fragmentary vertical longitudinal sectional view of the receiving end of the machine and portion adjacent thereto.

As hereinabove noted, the food product produced by the process and apparatus of the present invention is a fritter-encasing cooked frankfurter and improved means and process is herein provided for coating an uncooked frankfurter with batter. In accordance with the present invention, an uncooked frankfurter 16 of standard elongated shape is caused to pass the periphery of a batter coated roller 17 in close proximity thereto, so as to intersect the batter coating thereon, and during such inter-engagement of the frankfurter and batter coating on the roller, the frankfurter and roller are caused to rotate about their respective longitudinal axes so as to transfer a uniform coating of batter to the periphery of the frankfurter. Frankfurters are introduced to the machine by being initially deposited upon a conveyor 18 which comprises a pair of endless chains 19 and 21 supported and spaced in substantially parallel vertical planes and having transversely aligned upper and lower runs 22 and 23. Connected between the chains 19 and 21 and extending horizontally therebetween are a plurality of dish-shaped trays 24 which, as viewed in Figure 5, are of elongated form arranged with their concave side uppermost on the top run 22 for receiving in each of the trays, a frankfurter. The top run 22 of the conveyor moves from left to right, as viewed in Figures 4 and 5, to a delivery end 26 of the conveyor about which the trays 24 swing downwardly and invert to the under run 23 of the conveyor. At this point, the frankfurters 16 are deposited onto a pair of transversely spaced arcuate fingers 27 which, in turn, guide the frankfurters downwardly and slightly rearwardly onto the periphery of a rotating cylinder 28. This cylinder is mounted for rotation about a horizontal axis directly under and approximately coterminous with the transverse dimension of the conveyor 18 so that the frankfurters are deposited onto the periphery of the cylinder 28 with their longitudinal axes approximately horizontally arranged. Provided on the periphery of the cylinder 28 in circumferentially spaced relation are a plurality of elevator bars 29 which extend longitudinally of the cylinder and serve to pick up in succession frankfurters deposited on the roller periphery and to carry such frankfurters in an arcuate course of movement with the cylinder. Spaced around one side of the cylinder, being the left side as viewed in Figure 4, are a plurality of spring supported pressure rolls 31 which are mounted in an arcuate arrangement in spaced concentric relation to the cylinder 28 so as to define an arcuate passageway 32 therebetween. As will best be seen from Figures 3 and 4, the pressure rolls 31 are of hollow tubular form, each mounted on a centrally arranged helical spring 33 which extends lengthwise through the rolls and is secured at opposite spirally reduced ends 34 and 36, to arcuately shaped supporting arms 37 and 38 disposed in vertical planes adjacent the opposite ends of the cylinder 28. The rolls 31 are thus resiliently supported for movement to and from the periphery of the cylinder 28 while at the same time being permitted free individual rotation. Preferably, the radial spacing between the cylinder periphery and the rolls 31, that is, the transverse dimension of the passageway 32, is somewhat less than the normal thickness or diameter of the frankfurter, whereby the latter, in being transported through the passageway, will be firmly and rigidly supported between the periphery of the cylinder and the succession of rolls 31.

Advantage is taken of this firmly supported positioning of the frankfurter and its precise course of movement through the passageway 32 for transfer of the frankfurter to a second conveyor 39 for movement to the batter coating roller 17 and to other parts and operations of the machine. One of the principal features of conveyor 39 is its support of frankfurters exclusively at the opposite ends of the frankfurters with the entire periphery of the frankfurter exposed for processing as herein provided and to additionally permit rotation of the frankfurter while being so supported about its longitudinal axis. This important supporting of the frankfurter is herein provided by a plurality of impaling pins carried by the conveyor 39 in transversely spaced and aligned relation so as to be insertable into and removable from the opposite ends of the frankfurter axially thereof. As will be best seen from Figures 3 and 4, these pins are arranged in transversely aligned pairs each consisting of the pins 41 and 42, and are spaced at regular intervals along the length of the conveyor.

The conveyor 39 consists of two endless chains 43 and 44 mounted in spaced substantially vertical planes at the opposite ends of the conveyor 18 and the cylinder 28, and having upper and lower runs 46 and 47, with the corresponding runs of the chains having parallel courses of movement. One end 48 of the conveyor 39 is concentrically aligned with the passageway 32 so that the corresponding ends of chains 43 define the opposite ends of the passageway 32 and are caused to move in an arcuate course precisely aligned with the arcuate space of the passageway. The pins 41 and 42, as above mentioned, are carried transversely of the conveyor and the inner extremities 49 and 51 of the pins project into the space between the chains 43 and 44. As an important feature of the construction of the pins, the latter are reciprocally carried in sleeves 52 and 53, also providing the spacers for the respective chains, and, additionally, the pins are journaled for rotation in these sleeves. Accordingly, the pins 41 and 42 are carried by their respective chains 43 and 44 in an arcuate course of movement around the end 48 of the conveyor in a position substantially precisely at the transverse center of the arcuate passageway 32 in which the frankfurters are carried and supported as above described.

A common drive for chains 43 and 44 is provided so that the opposite pins 41 and 42 are moved in unison and in transversely aligned relation, such movement is timed to the movement of the conveyor 39 and the cylinder 28, so that the pins 41 and 42 are moved through the space 32 at the same speed as the frankfurters are deposited onto and carried by the elevator bars 29 on the periphery of the cylinder 28. The arrangement and support of the conveyor 39 is such that the upper run 46 moves to the left, as viewed in Figures 4 and 5, so as to enter the passageway 32 at the upper end thereof above the cylinder 28. Likewise, the driving of conveyor 18 in a timed relation to the conveyor 39 and cylinder 28 effects a depositing of frankfurters onto the cylinder 28 at intervals corresponding to their speed of removal by the elevator bars 29. Also, the timing between conveyor 39 and cylinder 28 is such that each frankfurter carried through space 32 will be at all times directly aligned with a pair of pins 49 and 51.

The transfer of the frankfurter onto the pins 49 and 51 is effected by causing an inward displacement of the pins while traversing the passageway 32 so that these pins will be inserted from a relatively retracted or outward position into the opposite ends of a frankfurter being simultaneously carried through the passageways as above described. Means for so displacing the pins here consists of a pair of identical cams 54 and 56 mounted at the opposite sides of the machine generally aligned with the passageway 32.

These cams are of segmented cylindrical shape having end faces which spiral inwardly and serve to engage heads 57 and 58 on the outer ends of pins 41 and 42 so as to urge and displace these pins in an inward direction while traversing the passageway 32.

The batter applying roller 17 hereinabove noted is mounted with its periphery in close proximity to the bottom run 47 of the conveyor 39 so as to present its periphery in coacting relation to frankfurters carried by the lower run of the conveyor upon leaving the conveyor end 38, where the frankfurters are transferred to the conveyor as above described. As will be thus seen from Figures 4 and 5, the roller is journaled for rotation upon a horizontal shaft 59, parallel to the bottom runs 47 of the chains 43 and 44 and has a length somewhat less than the spacing between these runs so that the full length of the roller periphery is presented in the space traversed by the frankfurter. As will best be seen in Figure 4, the frankfurters 16 are carried by the bottom run 47 of the conveyor in close proximity to the top of the roller 17, a recommended spacing being approximately 1/16".

Batter is arranged to be supplied to the periphery of roller 17 for transfer to the frankfurters as above described, and means for so supplying the batter here consist of a batter container 61 within which the periphery of the roller is caused to move. Preferably, the container 61 is of sufficient size to carry batter for a considerable operation period of the machine, and extends from a point somewhat ahead of roller 17 to the front end of the machine, that is, the left end as viewed in Figure 1. Widthwise, as will be seen from Figures 2 and 5, the container 61 has a somewhat greater dimension than the length of the roller 17, so that the full length of the roller will be immersed in batter with which the container is filled. Preferably, the bottom 62 inclines downwardly toward the roller 17 to permit filling of the container from the end of the machine and to insure a proper flow of the batter to the roller periphery. As will also be noted from Figures 1 and 4, the axis of the roller shaft is approximately at the top 63 of the batter container, so that the upper portion of the roller periphery extends above the level of the batter at all times. The roller is arranged to be rotated so as to coat the entire roller periphery with batter and particularly that portion extending above the container, and preferably a batter consistency and texture is used that will provide a relatively thick coating of batter on the roller, say approximately 1/4" in thickness. In this manner, a frankfurter traversing the top of the roller in closely spaced relation thereto, as above described, will intersect the batter coating, indicated by numeral 64 on Figure 4.

In accordance with the present invention and as a principal feature thereof, the frankfurter is caused to rotate about its longitudinal axis during the period of engagement of the frankfurter with the batter coating 64 on the roller, so as to bring all peripheral portions of the frankfurter into contact with the batter coating. In other words, the frankfurter is caused to rotate at least one complete revolution while in contact with the batter supported on the roller 17. In order to have batter continuously available for coating the frankfurter during its rotation, the roller 17 is likewise rotated, the rotation of the roller functioning to provide a constant supply of batter to the frankfurter being coated. Actually, it has been found desirable to supply batter to the interengaged area with the frankfurter at a faster rate than the movement of the frankfurter. In this manner, the batter is crowded onto and heaped upon the surface of the frankfurter so as to permit a desired thick coating to form on the frankfurter with a constant surplusage of batter from which to draw. The action is greatly facilitated by selecting a direction of rotation of the roller wherein the top of the roller moves toward the oncoming frankfurter. This is a counter-clockwise direction of rotation as viewed in Figure 4. Also, to insure a maximum relative movement of the frankfurter in the batter carried up and supported by the roller, the frankfurter is caused to rotate in a direction advancing the lower side of the frankfurter into the batter, that is, a counter-clockwise rotation of the frankfurter as viewed in Figure 4. This latter rotation of the frankfurter also assists in the elevation of the accumulated mass of batter at the forward side of the frankfurter, thereby tending to raise this mass over and around the frankfurter, whereby the frankfurter is thoroughly and completely enveloped by the batter.

While various relative diameters and rotating speeds of the roller and frankfurter may be used, particularly with various types of batter, it has been found that for a relatively stiff batter a proportioning of the roller diameter to a frankfurter diameter approximately as indicated in the drawings is satisfactory. The usual diameter of a frankfurter to be processed is approximately 7/8" and the corresponding roller diameter, as here shown, is approximately 3". For these relative diameters, a rotation of the roller of approximately three revolutions to each two revolutions of the frankfurter produces satisfactory results. As will be appreciated, the peripheral speed of the roller determines the amount of batter which is fed to the interengaged area of the frankfurter and batter coating, and this speed of rotation of the roller is dependent upon the amount of batter to be transferred to the frankfurter and also upon the consistency of the batter itself. A batter coating of approximately 1/8" on the frankfurter is desirable.

As above explained, the impaling pins 41 and 42 are fully inserted into the opposite ends of the frankfurter during its course of movement through the arcuate passageway 32 and as the frankfurter emerges from the lower end of the passageway it becomes disengaged from the lowermost roller 31 and is thereafter supported exclusively by the pins 49 and 51. Such latter support not only exposes the full length of the frankfurter to the roller 17 but also mounts the frankfurter for rotation with its coaxially inserted pins. Rotation of the frankfurter is obtained by causing the rotation of one of the pins 42 which, as will be seen from Figure 5, is formed with a flattened extremity 51 in contrast to the pointed cylindrical extremity 49 of pin 41. Each of the pins 42 is provided, adjacent the head 58 thereon, with a pinion 66 which is engaged, when in proximity to the batter roller 17, with a rack 67. The latter, as will be seen from Figure 3, overlies the pinion so as to impart thereto a desired direction of rotation as above described, and has a length extending lengthwise of the travel of the conveyor by a distance extending over the period of engagement of a frankfurter with roller 17.

The fully coated frankfurter is carried by the lower run 47 of the conveyor 39 from the batter roller 17 to the surface of a hot oil bath 68 contained in an open top trough-like receptacle 69 extending from adjacent the roller 17 to adjacent the opposite or delivery end of the machine. Preferably, rotation of the frankfurter is continued from the roller 17 to the hot oil bath so as to assist in the uniform distribution of the batter around the periphery of the frankfurter and to retain such distribution. However, the direction of rotation of the frankfurter at its point of immersion in the oil is preferably reversed from that at the roller, so that the forward surface of the frankfurter moves downwardly into the oil, that is, a clockwise rotation as viewed in Figure 4. Accordingly, a second rack 71, forming a substantial extension of rack 67, is provided, but at an elevation to engage the under side of pinions 66. As will be seen from Figure 4, the receptacle 69 is mounted somewhat below the roller 17 and spaced forwardly therefrom, and the bottom run 47 of the conveyor is caused to descend rather sharply over idler rollers 72, into the container, so as to bring the frankfurter in contact with the liquid. As the frankfurter is caused to continue its rotation while coming in contact with the liquid, the engagement of the surface of the batter with the oil causes a flow of the batter into a final uniform distribution around the frankfurter and a smoothing out of the outer surface of the batter. At the same time, the batter coating, upon rotating through the oil, sets in its smooth and uniformly distributed state.

As another important feature of the present invention, the batter encased frankfurter is caused to traverse the hot oil bath in such a manner and while being rotated, as to produce a greatly improved product. More particularly, we have found that the frankfurter should be submerged in the oil by approximately the depth only of its batter coating. As will be seen from Figure 4, the lower runs 47 of the conveyor are engaged under idler wheels 73, thus disposing the pins 41 and 42 just above the upper surface 74 of the oil in the receptacle 69. Also, means is provided for rotating pins 42, and the frankfurters carried thereby, throughout their entire course of movement through the receptacle 69. This means is furnished in part by the aforedescribed rack 71, which terminates at a point shortly after immersion of the frankfurters into the oil bath, and rotation is continued for the remaining travel in the container by a rack 76 which reengages the pinions on their upper sides after leaving rack 71. With the arrangement of racks as thus set forth, the frankfurters are caused to reverse their direction of rotation after entry into the oil and throughout the majority of the cooking operation turn in a counter-clockwise direction as viewed in the drawings. By turning of the frankfurter contra to its direction of movement lengthwise in the receptacle, maximum surface displacement of the frankfurter in the oil results, with an attendant acceleration of cooking speed.

It has been found that the submersion of the product in the oil to approximately only the thickness of the batter coating at the bottom of the frankfurter, at which position the frankfurter is well above the float level of the coated frankfurter in the oil, affords a result greatly superior to that obtained from allowing the frankfurter to be cooked while entirely submerged. By contrast, where the frankfurter and its batter coating are fully submerged in the hot oil and retained therein for the required cooking period, the portion of the batter coating next to the frankfurter tends to remain doughy or soggy. On the other hand, where the frankfurter is rotated as herein described, with substantially only the batter thickness submerged, the batter coating is uniformly cooked throughout its entire mass and is likewise thoroughly and uniformly heated. As will be appreciated, in the cooking process of the present invention, as above described, a majority of the outer peripheral surface of the batter coating is exposed to the air above the surface of the oil, and the peripheral area submerged is being constantly carried up into the air space above the oil by rotation of the frankfurter. A considerable portion, therefore, of the cooking of the present food occurs in a heated atmosphere conducive to the escape of vaporized oil and moisture products. It is apparent that this arrangement is largely instrumental in obtaining a fritter enclosure for the frankfurter which is completely cooked, relatively oil free, and of a desired aerated texture. At the same time, by insuring a relatively oil-free fritter coating, the frankfurter itself is kept from absorbing an excess of cooking oil and is thus made more palatable and more readily digestible.

Under certain circumstances, as for different types of batters, it may be desired to cause the product to traverse the oil at different levels. One way of affording this in a very simple manner is to tilt the machine slightly by having one end somewhat higher than the other.

The oil in container 69 may be heated in any suitable manner, and is heated, in the present embodiment, by means of a plurality of electrical heating elements 77, preferably thermostatically controlled to maintain an oil temperature of approximately 390 degrees F. to 400 degrees F. Also desirably, the outer wall of the container 69 is appropriately insulated, as with a jacket or shell of insulation material 78.

Figure 1:
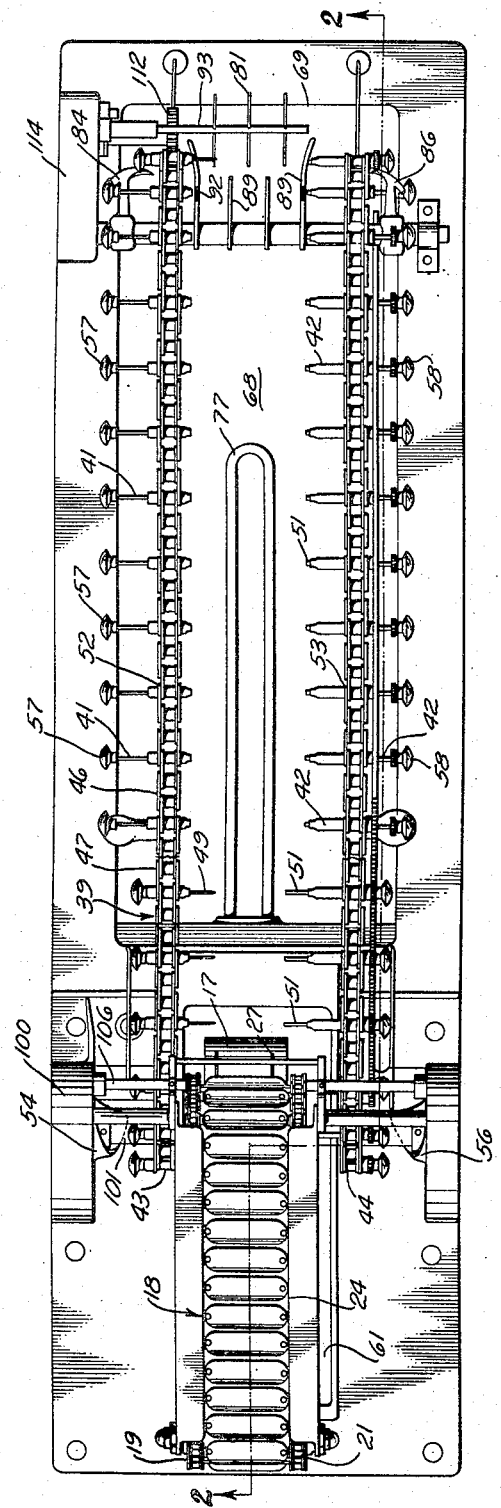
Figure 1 is a top plan view of a frankfurter cooking machine constructed in accordance with the present invention.
Figure 2:
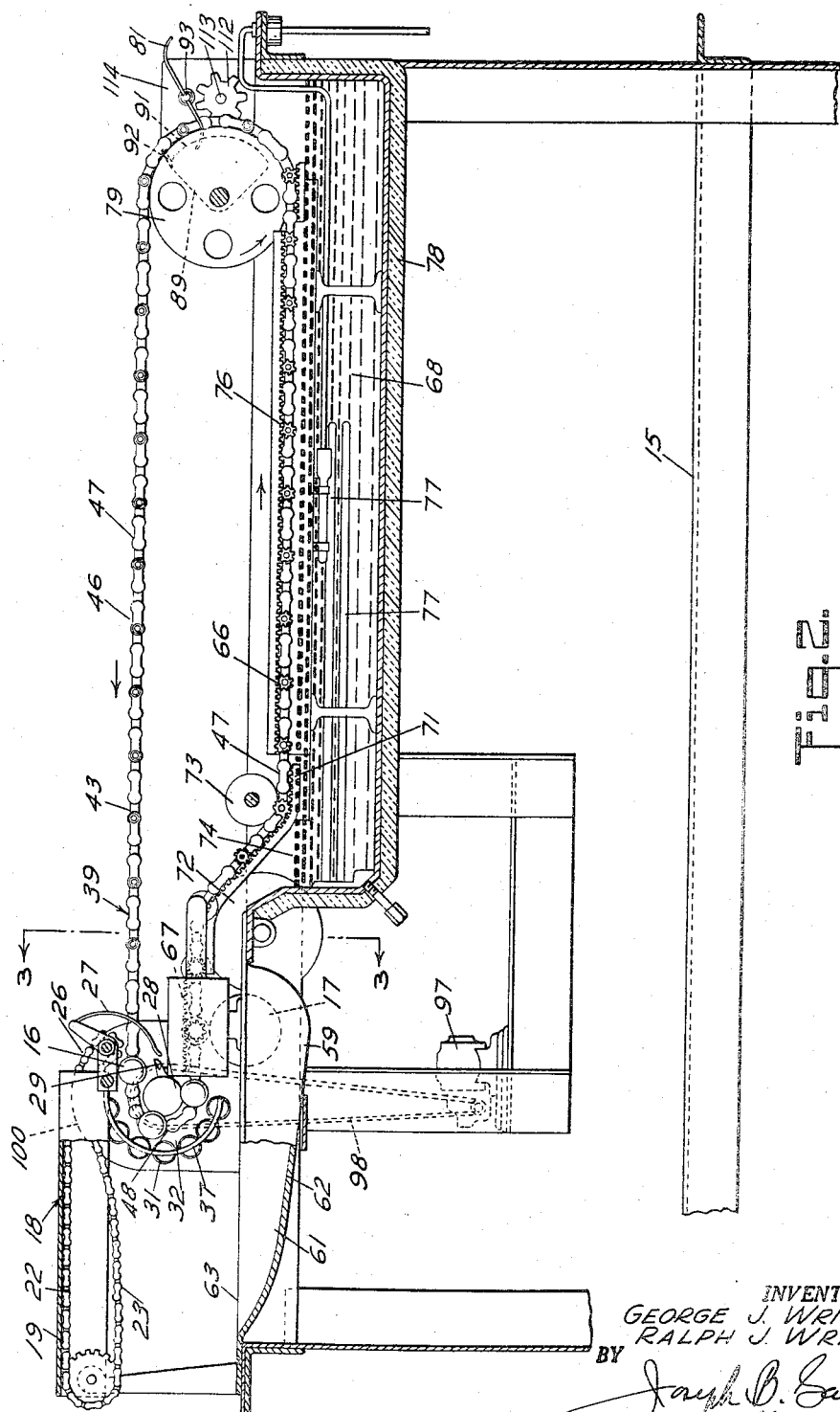
Figure 2 is a side view partly in section of the machine illustrated in Figure 1, the general plane of the section being taken on the line 2—2 of the latter figure.

As will be best seen from Figures 1 and 2, the batter coated frankfurter is carried by the lower run 47 of conveyor 39 into the cooking container 69 adjacent one end thereof, being the left end as viewed in the drawings, and thereafter traverses the surface 74 of the oil to adjacent the opposite end of the container, from where the frankfurter is carried up out of the container into the delivery mechanism. As will be understood, the length of the container 69 and the relative speed of travel of conveyor 39 determine the cooking duration to which the food product is subjected. In the present embodiment, and in accordance with the cooking process hereinabove described, a cooking time of approximately one hundred seconds has been found satisfactory. This has been based upon speed of travel of the lower run 47 of the conveyor, corresponding to a length of travel in the oil of approximately eight inches per minute and a speed of rotation of the frankfurter while in contact with the oil of approximately twenty revolutions per minute.

As previously stated, when the cooking operation has thus been completed, the cooked product is elevated and withdrawn from the oil and for this purpose, as will be clear from Figures 6, 7 and 8, the lower run 47 of the conveyor is moved upwardly and around idler wheels 79 defining a delivery end of the conveyor adjacent the far end of the receptacle 69. While traversing this delivery end of the conveyor, pins 41 and 42 are retracted from the opposite ends of the frankfurters, and the frankfurters, thus being released, are deposited upon delivery arms 81 which carry the frankfurters onto the upper end 82 of a delivery chute 83 extending from the machine. Retraction of the pins 41 and 42 is here effected by a pair of cams 84 and 86 mounted exteriorly of and at the opposite sides of conveyor chains 52 and 53 and having an arcuate form generally aligned with the arcuate course of movement of the conveyor around the delivery end. The cams 84 and 86 are formed with the outwardly diverging cam faces 87 and 88 arranged for engagement with the inner sides of the heads 57 and 58 of the pins to effect their outward retraction from the space between the conveyors, and from the ends of the frankfurters, while the pins are carried around the delivery end of the conveyor.

Desirably, a plurality of quadrant-shaped guard plates 89 are positioned with their arcuate peripheries 91 substantially aligned with the course of movement of the pins 41 and 42 so as to guide the frankfurters released from the pins onto the delivery arms 81. The transverse spacing of the outer guard plates 89 is somewhat less than the length of the frankfurters, and preferably outwardly extending stop pins 92 are secured at the upper ends of plates serving to engage and positively stop the continued movement of the frankfurters with the conveyor. As will best be seen from Figure 6, the arrangement of the cams 84 and 86 is such as to cause a complete retraction of the pins 41 and 42 prior to their reaching the pins 92, whereby the inner extremities 49 and 51 of the impaling pins will clear the stop pins 92. The pins 92, aside from positively defining the end position of the frankfurters as carried by the conveyor, also assist in detachment of the impaling pins from the frankfurters where part of the fritter casing extends lengthwise of the frankfurter by a distance greater than the retraction of the pins. In such cases, the positive stopping of the frankfurters by pins 92 causes the pins to shear through and become detached from such fritter extensions.

Delivery arms 81 are mounted centrally of their length on a horizontal shaft 93 positioned in endwise spaced relation to the arcuate peripheries of guard plates 89 and through the arcuate plane of the guard plates, it being noted that the spacing of the arms 81 along the shaft 93 is such as to position the arms between the guard plates. Also, as will be best seen from Figure 7, the arms 81, as viewed in side elevation, are curved to provide concave portions 94 approximately aligned with the descending frankfurters released at stop pins 92, so as to support the frankfurters with the length transversely arranged with respect to the machine. Drive means is provided for the shaft arm 93 so as to rotate the concave arm portions aforesaid through an arc in excess of 90 degrees for delivery of the frankfurters onto the top 82 of the delivery chute, the latter being provided with spaced fingers 96 staggered transversely from the arms 81, to thereby permit the movement of arms through the fingers for transfer of the frankfurters. Since the arc of rotation of the arms 81 intersects the course of movement of the frankfurter impaling pins 41 and 42, the arms 81 must be swung into frankfurter receiving position in timed relation to the passage of the impaling pins. In other words, the delivery arms 81 swing into and out of frankfurter receiving position in the interval between passing of the successive pairs of impaling pins. This is best accomplished by imparting to the arm shaft 93 an irregular angular velocity, so as to rapidly insert the arms into receiving position and rapidly displace the arms out of such position in the interval of time between the passage of the pins. This irregular angular velocity of movement of the arms is afforded by the segmental gear shown in Figure 9.

All of the moving parts of the machine are preferably driven from a single electric motor 97 mounted on the frame generally below the receiving end of the machine. This motor is connected by a drive belt 98 to a sheave 99 mounted in a gear box 100 at the side of the machine, the sheave being secured to a transversely extending shaft 101 upon which the elevator cylinder 28 is mounted, see Figure 4. A chain drive sprocket 102 is also secured on shaft 101 and enmeshed with the chains 52 and 53 of the main conveyor 39, see Figure 3. Likewise secured to the shaft 101 within the gear casing 100 is a gear 103 which is enmeshed with a second gear 104 mounted on another transverse drive shaft 106. The latter supports for rotation therewith drive sprockets 107 engaged with the conveyor chains 19 and 21, the sprockets 107 defining the delivery end 26 of the conveyor 18. Rotation of the shaft 59 of the batter roller is effected by a belt 108 mounted on sheaves 109 and 111 on shafts 101 and 59 respectively. The drive connection for the shaft 93 of the delivery arms 81 is taken off from the conveyor 39 at the discharge end thereof by means of a sprocket 112 mounted on the side of the machine in alignment with and close proximity to the idler wheels 79 and enmeshed with chain 43. The shaft 113 of the sprocket 112 is journaled for rotation in a gear case 114 within which and secured to shaft 113 is a gear 116 which is constantly enmeshed with a gear 117 mounted on a stub shaft 118. A segmental gear 119 is mounted for rotation with gear 117 and is engageable with a complementary segmental gear 121 of smaller diameter secured to the arm shaft 93 which extends into the casing 114, it being noted that the engagement of the segmental gears 119 and 121 imparts an accelerated movement to the shaft 93 corresponding to the movement of the arms 81 into and through their receiving and delivery operation as above described. Also mounted on shaft 93 in alignment with gear 117 is another segmental gear 122 arranged to enmesh with gear 117 during the arc of movement when segmental gears 121 and 122 are out of engagement. Segmental gear 122 has a diameter somewhat greater than gear 117, so that during the period of engagement of these two gears there is a deceleration of the speed of rotation of the arm shaft 93.

We claim:

1. A machine for coating a frankfurter with batter comprising, a batter container, a roller mounted over said container with only a portion of its perimeter disposed within said container, a frankfurter conveyor mounted above said roller and including means to support frankfurters for linear movement over said roller in close proximity to the periphery thereof and with the longitudinal axes of the frankfurters and roller parallel, means rotating the roller, and means effecting rotation of the frankfurters independent of said roller rotation while moving over the roller.

2. A machine for coating a frankfurter with batter comprising, conveyor means comprising a pair of endless chains mounted in spaced relation and having substantially parallel courses of movement, means for driving said chains and at the same speed, an inwardly directed impaling pin rotatably mounted on each of said chains in aligned and opposed relation and arranged for axially supporting a frankfurter between said chains, a roller journaled for rotation about a relatively fixed axis at substantially right angles to said courses of movement and with the periphery of said roller positioned between said chains and in close proximity thereto, rotative drive means for said roller, a gear carried by one of said pins, a rack mounted for engagement with said gear for rotating said last named pin during movement thereof adjacent to said roller periphery.

3. A machine for coating a frankfurter with batter comprising, a batter container, a roller mounted with only a portion of its perimeter in said container, means for rotating said roller, conveyor means overlying said roller including a pair of parallel spaced members each having the same speed and a course of movement passing said roller periphery at substantially right angles to the axis of said roller and in close proximity to the periphery thereof, means for moving said members, opposed rotatably mounted impaling means carried by each of said members formed for releasable engagement with and support of the opposite ends of a frankfurter, and means rotating said impaling means during that portion of its course of movement with said members in proximity to said roller.

4. A machine for coating a frankfurter with batter comprising, a batter container, a substantially cylindrical roller and rotative drive means therefor mounted whereby only a portion of the perimeter of said roller is disposed within said container, an endless conveyor disposed over said roller and having a course of movement substantially normal to the axis of said roller and passing said roller periphery in spaced close proximity thereto, drive means for said conveyor, inwardly directed opposed frankfurter impaling means rotatably carried by said conveyor, and means rotating said impaling means during that portion of its course of movement with said conveyor in proximity to said roller.

5. A machine for coating a frankfurter with batter comprising, a batter container having an open top, a roller journaled for rotation about a generally horizontal stationary axis with only a portion of the perimeter of said roller disposed in said container through the open top thereof, rotative drive means for said roller, conveyor means including a pair of endless chain members mounted in spaced parallel relation adjacent to the opposite ends of said roller and with the courses of movement of said chain members substantially perpendicular to said roller axis, inwardly directed frankfurter impaling means rotatably carried by said chain members and insertable within the opposite ends of a frankfurter to support the latter between said chain members for movement into close proximity with the periphery of said roller, and means rotating said impaling means while in close proximity to said roller.

GEORGE J. WRIGHT.
RALPH J. WRIGHT.

References Cited in the file of this patent

UNITED STATES PATENTS

| Number | Name | Date |
| --- | --- | --- |
| 231,528 | Blackwell | Aug. 24, 1880 |
| 2,061,692 | Bagley | Nov. 24, 1936 |
| 2,074,432 | Rollings | Mar. 23, 1937 |
| 2,182,068 | Clark | Dec. 5, 1939 |
| 2,221,910 | Davis | Nov. 19, 1940 |
| 2,336,401 | James | Dec. 7, 1943 |